April 15, 1941.  J. H. KERBER  2,238,389
TRUCK GRADER
Filed May 8, 1939  4 Sheets-Sheet 3
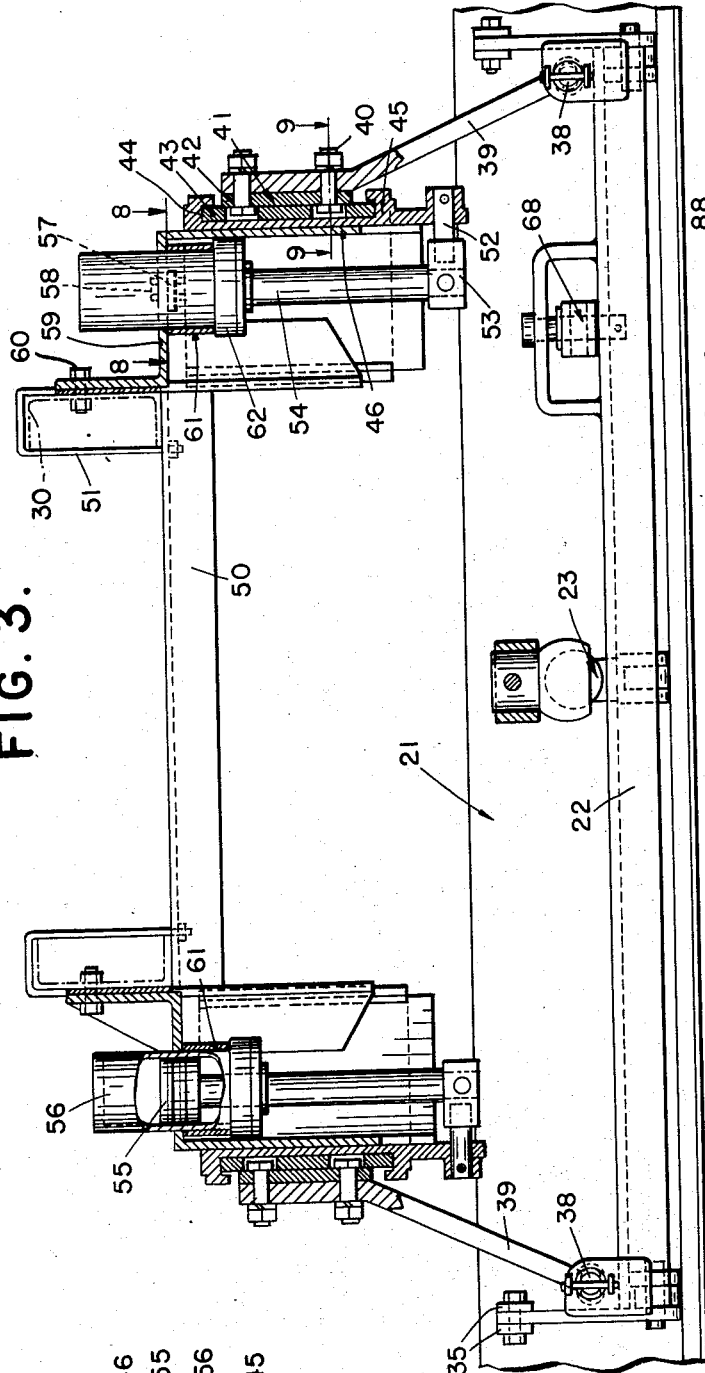
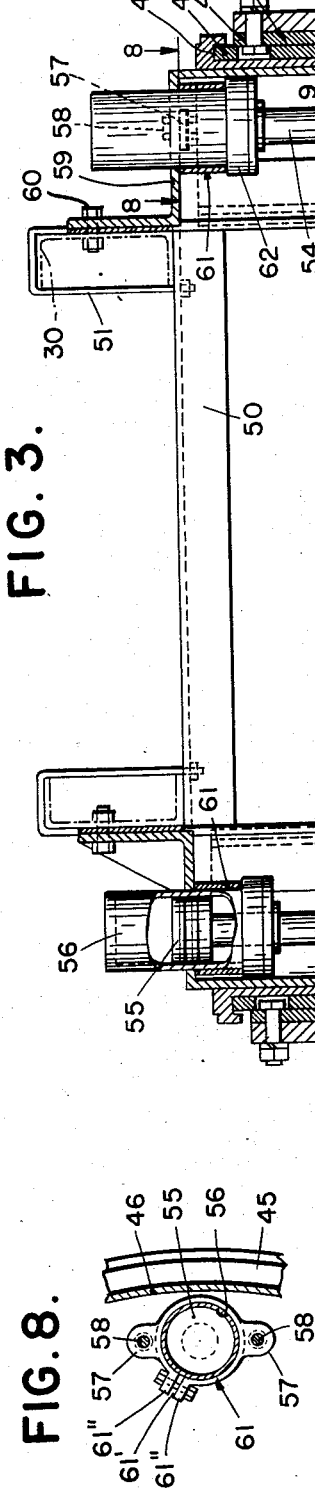
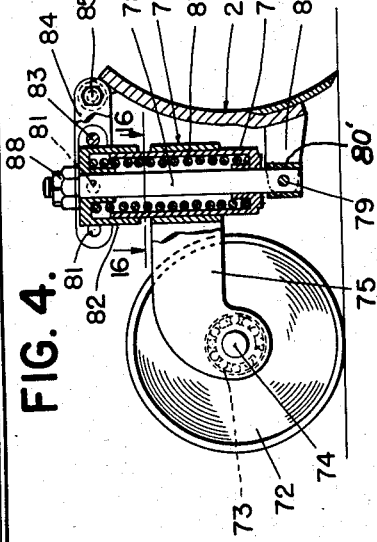
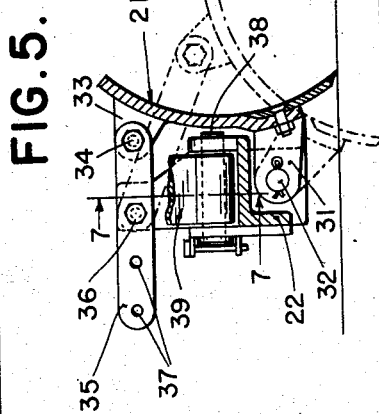
INVENTOR
Joseph H. Kerber
BY
Louis O. French
ATTORNEY April 15, 1941.  J. H. KERBER  2,238,389
TRUCK GRADER
Filed May 8, 1939  4 Sheets-Sheet 4
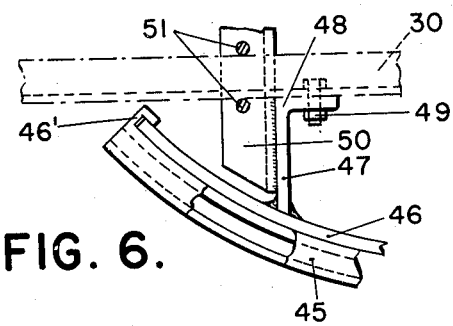
FIG. 6.
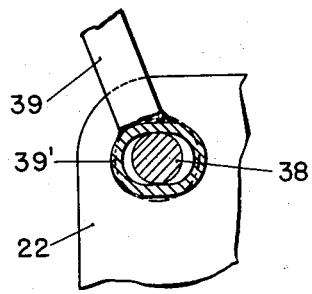
FIG. 7.
FIG. 10.
FIG. 14.
FIG. 11.
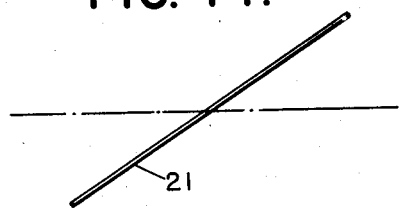
FIG. 15.
FIG. 12.
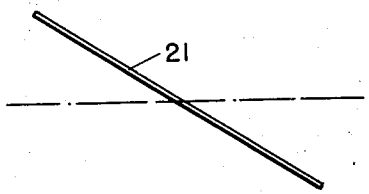
FIG. 13.
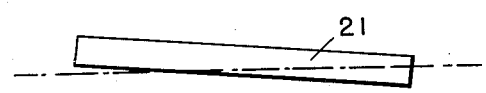
FIG. 16.
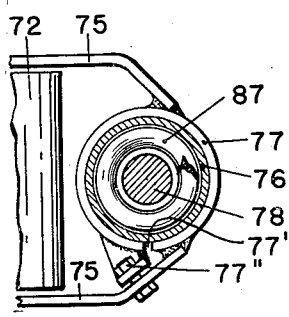
FIG. 9.
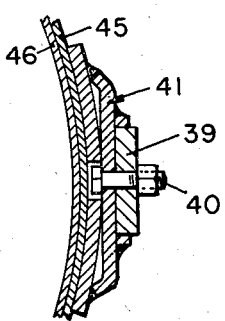
INVENTOR
Joseph H. Kerber
BY
Louis O. French
ATTORNEY Patented Apr. 15, 1941

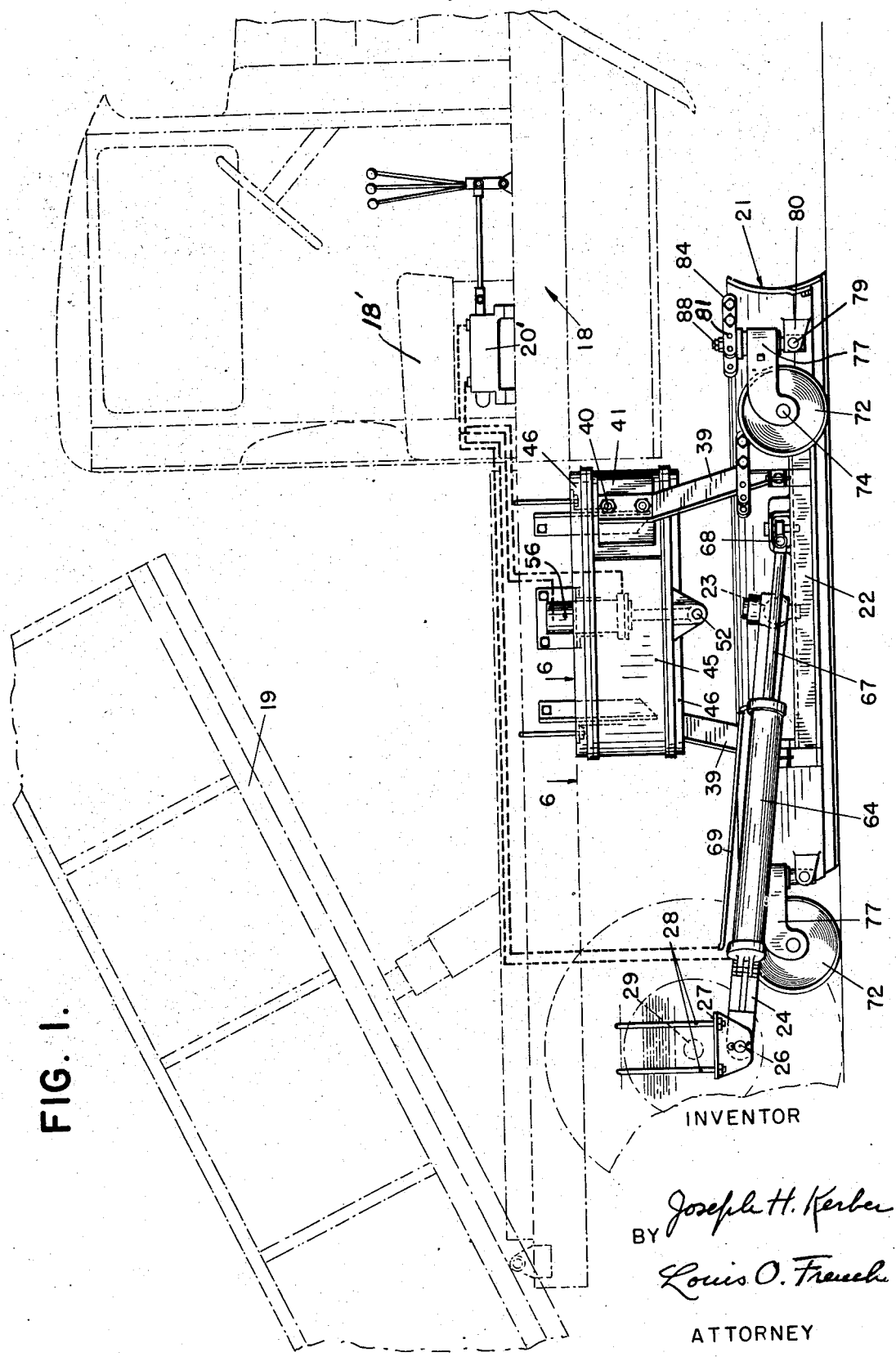

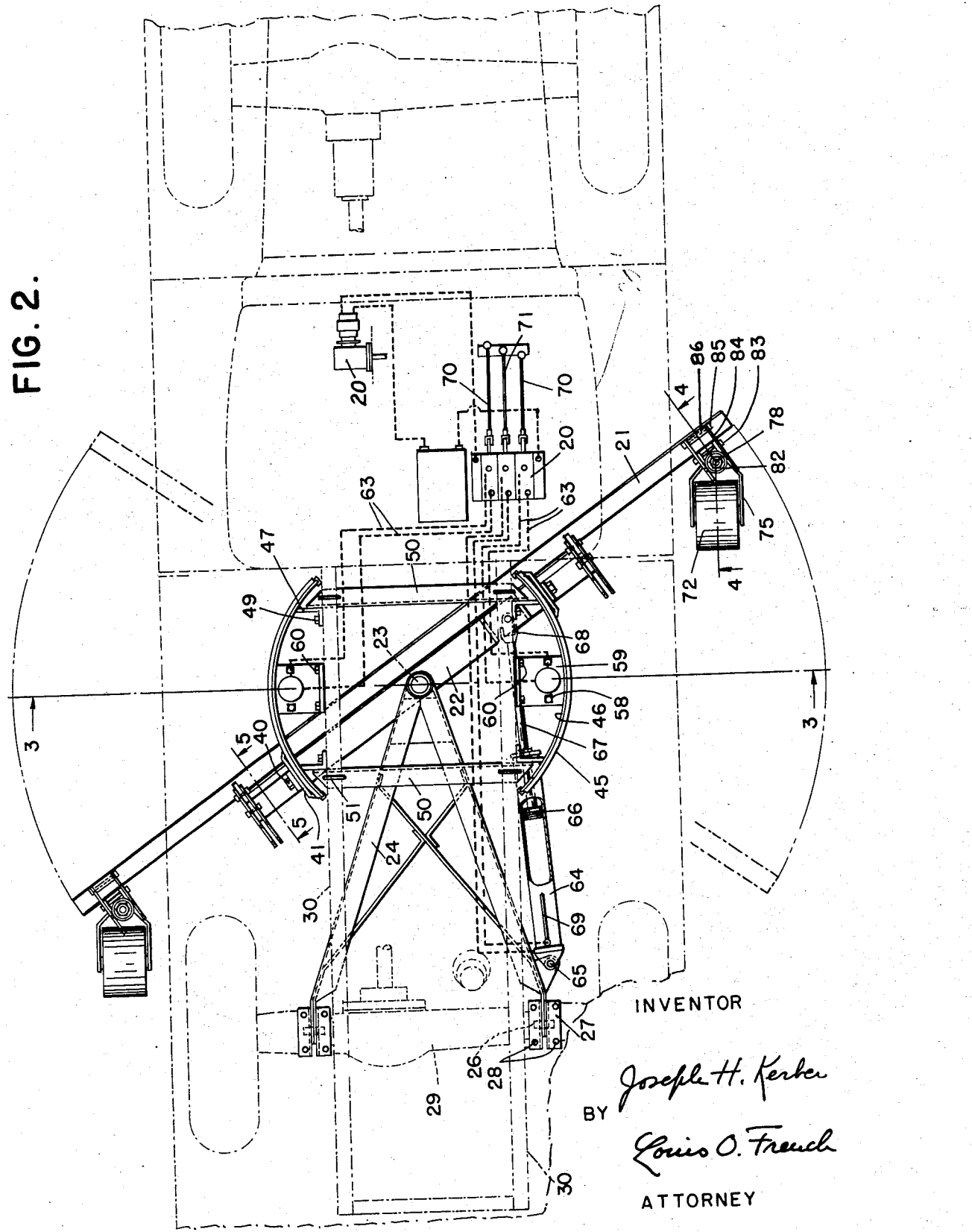

2,238,389

UNITED STATES PATENT OFFICE 2,238,389

TRUCK GRADER

Joseph H. Kerber, Milwaukee, Wis., assignor to Hi-Way Service Corporation, Milwaukee, Wis., a corporation of Wisconsin Application May 8, 1939, Serial No. 272,491

8 Claims. (Cl. 37—155)

The invention relates to road graders.

The general object of the invention is to provide a scraper blade attachment that may be readily applied to an industrial truck so that such truck can be used for road patrol work and provide the motive power for operating the scraper blade and thus save the expense of a special tractor grader.

One of the objects of the invention is to provide an arrangement in which the scraper blade may be hung from hydraulically controlled supports mounted on the truck to adjust its elevation and vertical inclination.

Another object of the invention is to provide an arrangement in which the scraper blade is adjustable angularly in a horizontal plane by a hydraulic cylinder.

A further object of the invention is to provide a scraper blade mounting in which in addition to the angular adjustment vertically and horizontally the blade also has a tipping adjustment so as to vary the angle or pitch that the cutting edge of the blade or mold board makes with the roadway.

A further object of the invention is to provide a scraper blade with spring loaded roller to eliminate chattering of the blade.

A further object of the invention is to provide an under-slung rear axle mounted push frame for the blade.

A further object of the invention is to provide scraper structure in which the push frame has a swivel connection with the blade structure.

A further object of the invention is to provide a double acting hydraulic ram for changing the angular position of the scraper blade, said ram having a universal joint connection with the blade structure.

The invention further consists in the several features hereinafter set forth and more particularly defined by claims at the conclusion hereof.

In the drawings:

Fig. 1 is a side elevation view of a grader structure embodying the invention;

Fig. 2 is a plan view of the improved grader structure, parts being broken away and parts being shown in section;

Fig. 3 is a detailed sectional view taken on the line 3—3 of Fig. 2;

Fig. 4 is a detailed sectional view taken on the broken line 4—4 of Fig. 2;

Fig. 5 is a detailed sectional view taken on the line 5—5 of Fig. 2;

Fig. 6 is a detailed view taken on the line 6—6 of Fig. 1;

Fig. 7 is a detailed sectional view taken on the line 7—7 of Fig. 5;

Fig. 8 is a detailed sectional view taken on the line 8—8 of Fig. 3;

Fig. 9 is a detailed sectional view taken on the line 9—9 of Fig. 3;

Figs. 10, 11, 12, and 13 are elevation views of the scraper blade or mold board showing it in different positions of vertical adjustment;

Figs. 14 and 15 are plan views of the mold board showing it in different positions of horizontal angular adjustment;

Fig. 16 is a detailed vertical sectional view taken on the line 16—16 of Fig. 4.

Referring to the drawings, I have shown the device embodying the invention applied to a motor driven truck 18 of conventional form and having a dump body 19 and provided with an hydraulic pump 20 furnishing hydraulic fluid under suitable pressure to a system including a control valve mechanism 20' mounted adjacent the truck operator's seat 18'.

The scraper blade or mold board 21 is connected to a frame 22 which at its center is connected through a ball and socket swivel joint 23 to an angular push frame 24, the legs of which at their base end are each respectively pivotally connected at 26 to a bracket 27 which is clamped by U-bolts 28 to the rear axle housing 29 of the truck at a point outside the side frames 30 of said truck. The blade is vertically angularly adjustably mounted on the frame member 22 by ears 31 at its lower part connected to said member by pins 32 and by ears 33 at its upper part connected by bolts 34 to links 35 which in turn are adjustably connected to the member 22 by bolts 36 that are adapted to engage in any one of a series of holes 37 in said links 35, the blade being shown in full in Fig. 5 in one angular position and being shown in dotted in said figure in another angular position.

At the end portions of the blade 21 the frame member 22 has pin connections 38 to loosely receive the oval eyed ends 39' of hangers 39 which at their upper ends are secured by bolts 40 to arcuate slides 41 formed of welded together plates 42 and 43, the plate 43 being guided in each instance in arcuate guideways 44 formed in an arcuately curved supporting member 45 which in turn is vertically slidably mounted on an arcuate supporting member 46 whose ends are slidably mounted in vertically disposed guideways 46' formed in said members 45.

Each of the members 46 has angled brackets 47 welded thereto adjacent its ends, whose vertically disposed bases 48 are adapted to be secured to the outer side of the truck side bars 30 by bolts 49. Transversely disposed frame members 50 are welded to the brackets 47 and extend transversely of and under the side bars 30 to which they are secured by U-bolts 51. The curvature of the members 46 is such that when said members are clamped together, they form the sides of a turntable about which the hangers 39 may be turned through the turning of the slides 41 on their supporting members 45, the members 45 also being vertically slidably mounted on the supports including the members 46.

Hydraulically operated means are provided for raising and lowering the blade by raising and lowering the members 45. Each member 45 has a pin 52 connected to a lug 53 on the lower end of the rod 54 of a piston 55 which works in a cylinder 56 that is connected to the members 46 through ears 57 on said cylinder connected by bolts 58 to an angled bracket 59 secured to or formed integral with the member 46, said bracket being secured by bolts 60 to the side bars 30. A split spacing sleeve 61 surrounds each cylinder with the split ends 61" carrying a bolt 61' to clamp said sleeve to said cylinder and is interposed between the bracket 59 and the flanged base 62 of the cylinder. The cylinder 56 is supplied at opposite ends with hydraulic fluid from the valve mechanism 20' through suitable piping not shown in full but indicated by the dotted lines 63. Introduction of hydraulic fluid under pressure to the lower end of the cylinders 56 acts on the pistons 55 to raise the members 45 and hence the slides 41, hangers 39, frame 22, and the blade 21 connected therewith to vary the vertical height of the blade 21 relative to the roadway being scraped as shown in Figs. 10 and 11 and by raising one end of the blade more than the other vary the vertical angularity of said blade as shown in Figs. 12 and 13, the loose connections 38 permitting such angular adjustment of the blade.

The horizontal angularity of the blade is controlled by hydraulically operated means for swinging said blade and its hangers angularly relative to the support. This means comprises an hydraulic cylinder 64 carried by the frame 24 and pivotally connected at 65 thereto, a piston 66 working in said cylinder and having a rod 67 working through a stuffing box in said cylinder and connected through a universal joint connection 68 with the frame member 22, the ends of said cylinder 64 being connected by suitable piping 69 including flexible portions to the control valve 20'.

With the above construction introduction of hydraulic fluid under pressure to the closed end of the cylinder 64 causes the blade to be turned toward the right to the angular position shown in Fig. 2 and Fig. 15, and introduction of said fluid to the opposite end of said cylinder causes the blade to be swung to the position shown in Fig. 14.

It is to be noted in connection with the hydraulic cylinders that when pressure fluid is introduced at one side of the piston, fluid is exhausted from the other end of the cylinder through the action of the control valve mechanism 20'. As indicated in Fig. 2 each of the cylinders 56 has its own control valve which is operated by a separate actuator 70 adjacent the operator's seat 18', and the cylinder 64 has a control valve which is operated by the actuator 71.

To prevent a chattering action of the scraper blade, the ends thereof are each associated with a spring mounted roller 72. Each roller 72 is mounted on a ball bearing journal 73 on a shaft 74 carried by the arms 75 of a yoke member 77 which has a split sleeve portion separated by the slot 77' with its parts clamped about the cylinder 76 by a bolt 77". The cylinder 76 is slidably mounted on a pin 78 which is secured at one end by a pin 79 to a spacing sleeve 80' and spaced lugs 80 on the blade 21 and is connected at its other end through a cap 82 provided with lugs that are adjustably secured by a bolt 83 passing through any one of a set of holes 81 in the spaced links 84 pivotally mounted on a bolt 85 carried by a lug 86 on said blade. A spring 87 is interposed between the cylinder 76 and the cap 82. The cap 82 is slidingly adjustable relative to the pin 78 and is held in adjusted position by means of a nut 88 on the threaded upper end of the pin 78. With this arrangement the roller support including the cylinder 76 is yieldingly supported relative to the pin 78, and the blade and the rollers provide in effect an additional support at the ends of the blade which prevent the same from chattering under certain conditions of use.

From the foregoing it will be noted that I have provided a scraper blade apparatus which may be readily applied to industrial type trucks and in which the blade may be moved to different horizontal and vertical positions through hydraulically operated cylinders which are under the control of the operator at his seat on the truck.

I desire it to be understood that this invention is not to be limited to any particular form or arrangement of parts except in so far as such limitations are included in the claims.

What I claim as my invention is:

1. The combination with a motor driven truck having side bars, a rear axle, and front and rear wheels, of supporting means clamped to said side bars in the space between said front and rear wheels, a grader blade, hangers connecting the end portions of said blade with said supporting means, means for raising and lowering said blade and hangers, a push frame for said blade operatively connected to said rear axle, and means for swinging said blade and hangers angularly in a generally horizontal plane.

2. The combination with a motor driven truck having a frame and a rear axle, of a scraper blade, means for hanging said blade from said frame for vertical and horizontally angular adjustment relative to said truck, and a push frame operatively connected to the central portion of said blade and pivotally connected to the rear axle, and an hydraulic cylinder and its piston connected to said push frame and to said blade at a point offset from the central connection of said push frame with said blade and adapted to swing said blade in either direction in a generally horizontal plane about said central connection.

3. The combination with a motor driven truck having side bars, a rear axle, and front and rear wheels, of supporting means clamped to said side bars in the space between said front and rear wheels, a grader blade, hangers connecting the ends of said blade with said supporting means, means for independently raising and lowering each hanger and the end of the blade connected therewith, a push frame for said blade operatively connected to said rear axle, and means carried by said push frame for swinging said blade angularly relative to a horizontal plane.

4. The combination with a motor driven truck having a frame, of supporting means clamped to said frame, a blade mounting member, a scraper blade vertically angularly adjustably connected at spaced points to said member, means for hanging said member from said supporting means for vertical and angular movement relative thereto, means for raising and lowering said hanging means, and independently supported means operatively connected between a part of said truck and said member for moving said blade angularly.

5. The combination with a supporting frame including spaced side bars, of an arcuate support clamped to each side bar, an arcuate member vertically slidably mounted on each support, a slide laterally slidably mounted in each arcuate member, a blade structure, hangers connecting the end portions of the blade structure with said slides, an hydraulic cylinder having its piston operatively connected to each arcuate member for independently raising and lowering the same, and means for swinging said blade structure in a generally horizontal plane.

6. The combination with a supporting frame including spaced side bars, of an arcuate support clamped to each side bar, an arcuate member vertically slidably mounted on each support, an hydraulic cylinder and a piston working in said cylinder and operatively connected to each arcuate member, a slide laterally slidably mounted on each arcuate member, a blade structure, hangers connecting the end portions of the blade structure with said slides, and means including an hydraulic cylinder and its ram operatively connected to said blade structure for swinging the same in a generally horizontal plane.

7. The combination with a supporting frame including spaced side bars and a rear axle, of an arcuate support clamped to each side bar, an arcuate member vertically slidably mounted on each support, a slide laterally slidably mounted on each arcuate member, a blade structure, hangers connecting the end portions of the blade structure with said slides, an hydraulic cylinder having its piston operatively connected to each arcuate member for independently raising and lowering the same, a push frame pivotally connected to the rear axle and connected to the central portion of said blade structure, and means carried by said push frame and connected to said blade structure to turn said blade in a generally horizontal plane.

8. The combination with a motor driven truck having side bars, a rear axle and front and rear wheels, of supporting means clamped to said side bars in the space between said front and rear wheels, a grader blade, hangers connected with the end portions of the blade, hydraulically operated means for independently raising and lowering each hanger and the end of the blade connected therewith, a push frame for said blade operatively connected to said rear axle, and hydraulically operated means carried by said push frame and operatively connected to said blade to turn the same in a generally horizontal plane.

JOSEPH H. KERBER.